United States Patent [19]

Unger et al.

[11] Patent Number: 5,525,710

[45] Date of Patent: Jun. 11, 1996

[54] HIGHLY POROUS CHITOSAN BODIES

[75] Inventors: Peter D. Unger, Convent Station; Ronald P. Rohrbach, Flemington, both of N.J.

[73] Assignee: AlliedSignal Inc., Morris Township, N.J.

[21] Appl. No.: 304,617

[22] Filed: Sep. 12, 1994

Related U.S. Application Data

[63] Continuation of Ser. No. 25,548, Mar. 3, 1993, abandoned, which is a continuation-in-part of Ser. No. 811,757, Dec. 20, 1991, abandoned.

[51] Int. Cl.$^6$ ............................... C07H 5/06; C07H 1/00; C08B 37/08
[52] U.S. Cl. ................ 536/18.700; 536/20; 536/55.3
[58] Field of Search ........................ 536/20, 18.7, 55.3

[56] References Cited

U.S. PATENT DOCUMENTS

| | | | |
|---|---|---|---|
| 4,002,173 | 1/1977 | Manning et al. | 536/119 |
| 4,336,070 | 6/1982 | Koshugi | 106/122 |
| 4,619,995 | 10/1986 | Hayes | 536/20 |
| 4,659,700 | 4/1987 | Jackson | 514/55 |
| 4,833,237 | 5/1989 | Kawamura et al. | 536/20 |
| 4,879,340 | 11/1989 | Moriguchi | 525/542 |
| 4,895,724 | 1/1990 | Cardinal et al. | 514/54 |
| 4,966,919 | 10/1990 | Williams, Jr. et al. | 521/54 |
| 4,975,542 | 12/1990 | Hirayama | 536/20 |
| 5,169,535 | 12/1992 | Adachi et al. | 210/669 |

FOREIGN PATENT DOCUMENTS

| | | |
|---|---|---|
| 289238 | 11/1988 | European Pat. Off. . |
| 424672 | 5/1991 | European Pat. Off. . |
| 2282905 | 3/1976 | France . |
| 3527482 | 2/1986 | Germany . |
| 133143 | 6/1986 | Japan . |
| 2178447 | 2/1987 | United Kingdom . |

*Primary Examiner*—Douglas W. Robinson
*Assistant Examiner*—Everett White
*Attorney, Agent, or Firm*—Michele G. Mangini; Melanie L. Brown

[57] ABSTRACT

There is provided a crosslinked, highly porous chitosan body, wherein the porous body is characterized in that it has an open-celled 3-dimensional lattice structure, a density of less than about 0.75 g/cm$^3$, a surface area of equal to or greater than about 170 m$^2$/g, and a compression strength of equal to or less than about 75% yield at 300 psi.

21 Claims, 1 Drawing Sheet

HIGHLY POROUS CHITOSAN BODIES

CROSS REFERENCE TO RELATED APPLICATION

This application is a continuation of application Ser. No. 08/025,548, filed Mar. 3, 1993, now abandoned, which is a continuation-in-part of application Ser. No. 811,757, filed Dec. 20, 1991, now abandoned..

FIELD OF THE INVENTION

This invention relates to porous chitosan bodies which possess a low density and a high surface area as well as one or more other beneficial properties such as pore volume and strength characteristics, which are make them suitable for many industrial applications, such as insulating materials, fibers, absorbents, adsorbents, ion-exchange resins, membranes and support materials for a wide variety of uses. The porous bodies have an open-celled 3-dimensional lattice structure.

Description of the Prior Art

Chitosan is a deacylated derivative of chitin. Chitin is a mucopolysaccharide of poly-N-acetyl-D-glucosamine, which is the major constituent material of the outer shells of Crustacea, such as shrimp, lobster and crab. Chitosan has been utilized in many different applications, e.g., as fillers, absorbents, enzyme carriers and chromatographic supports.

As is known in the art, chitosan can easily be coagulated or set to form gels. However, chitosan gels do not have any substantial physical strength. In addition, the gels are readily dehydrated to form dense, non-porous solids. Consequently, many efforts have been made to crosslink chitosan gels to add strength and rigidity to the gels. For example, Japanese Patent Publication No. 61-133143, published Jun. 20, 1986, and U.S. Pat. No. 4,833,237 to Kawamura et al. disclose crosslinked granular bodies derived from a low molecular weight chitosan. The process for producing the chitosan bodies comprises dissolving a low molecular weight chitosan into an aqueous acidic solution, pouring the solution into a basic solution to form porous, granular gel bodies of chitosan, thoroughly replacing the water contained in the granular gel bodies with a polar solvent, and then crosslinking the granular bodies with an organic diisocyanate. However, it has been found that the water-solvent replacement process causes a significant portions of the pores, especially fine pores, to collapse. Consequently, the resultant product is swellable and has significantly reduced surface area.

SUMMARY OF INVENTION

The present invention provides a crosslinked, highly porous chitosan body, which is characterized in that it has an open-celled 3-dimensional lattice structure, a density of less than about 0.75 g/cm$^3$, a surface area of equal to or greater than about 170 m$^2$/g, and a compression strength of equal to or less than about 75% yield at 300 psi.

The present invention further provides a process for making a crosslinked, highly porous chitosan body comprising the steps of dissolving chitosan in a gelling solvent, forming a gel from the dissolved chitosan solution into a desired configuration, gradually replacing the gelling solvent with a crosslinking solvent by employing a concentration gradient solvent exchange process, adding a crosslinking agent to crosslink the gel, and isolating the crosslinked gel from the crosslinking solvent, wherein the porous body is characterized in that it has an open-celled 3-dimensional lattice structure, a density of less than about 0.75 g/cm$^3$, a surface area of equal to or greater than about 170 m$^2$/g, and a compression strength of equal to or less than about 75% yield at 300 psi.

The present invention also provides a process for making a crosslinked, highly porous chitosan body comprising the steps of dissolving chitosan in a gelling solvent that contains an additive selected from the group consisting of surfactants, elastomeric additives, and polyols; forming a gel from the dissolved chitosan solution into a desired configuration; freeze-drying the gel; adding a crosslinking solvent to the freeze-dried gel; adding a crosslinking agent to the crosslinking solvent, and isolating the crosslinked gel from the crosslinking solvent, wherein the porous chitosan body is characterized in that it has an open-celled 3-dimensional lattice structure, a density of less than about 0.75 g/cm$^3$, a surface area of equal to or greater than about 170 m$^2$/g, and a compression strength of equal to or less than about 75% yield at 300 psi.

The present porous chitosan bodies exhibit numerous beneficial properties including low density and high surface area as well as high pore volume and excellent strength characteristics. In addition, the porous chitosan bodies have excellent dimensional stability even after thorough dehydration and rehydration, especially at high levels of crosslinkage in such levels that are not possible to accomplish using the prior art solvent exchange processes.

DESCRIPTION OF THE DRAWINGS

The FIGURE is a schematic drawing which depicts a porous body of this invention and its open-celled 3-dimensional lattice structure. The FIGURE depicts a section of the open-celled 3-dimensional lattice of a porous body of this invention. The porous body 1 has pores 2, which form a continuous network of pores.

DETAILED DESCRIPTION OF THE INVENTION

Figure 1:
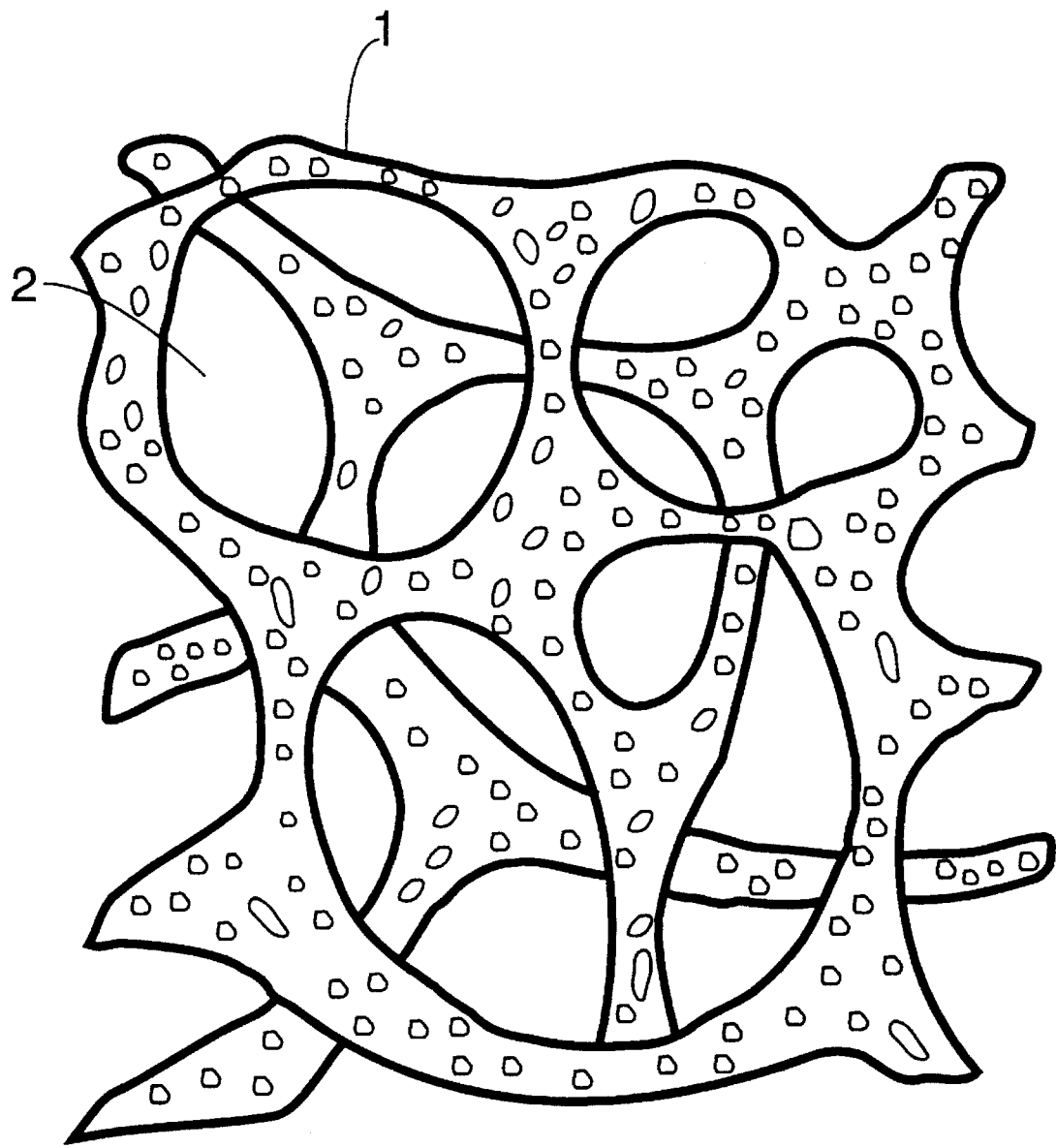

As mentioned above, the present invention provides highly porous, high-strength crosslinked bodies derived from chitosan. The porous bodies have a 3-dimensional open-celled lattice structure, for example, as illustrated in the FIGURE. The porous chitosan bodies of the present invention are crosslinked utilizing a novel solvent exchange process to provide the high porosity, as well as excellent strength and dimensional stability. The process for producing the present porous chitosan bodies comprises preparing a solution of chitosan in an aqueous acidic solution, forming chitosan gel bodies by setting or coagulating the chitosan solution in a basic solution, gradually replacing the water content of the gel bodies with a crosslinking solvent, and reacting the gel bodies with a crosslinking agent.

Chitosan, as stated above, is prepared by hydrolytically deacylating chitin. The suitable chitosan for the present invention has the degree of deacylation of at least about 50%, preferably at least about 75%, and more preferably at least about 80%.

Chitosan is solubilized in water or aqueous solutions, preferably in acidic solutions, to form flowable chitosan solutions. Preferably, the acidic solutions suitable for the present invention have a pH of between about 1.5 to about 6. The concentration of chitosan solution is freely selected to accommodate particular needs of different applications. Preferably, the concentration of chitosan suitable for the present invention is in the range of from about 0.05 wt % to about 20 wt %, more preferably from about 0.5 wt % to about 15 wt %, and more preferably from about 1 wt % to about 10 wt %.

The chitosan solution is set or coagulated to form a free-standing and porous gel by exposing the solution to a gelling solvent known in the art to contain a coagulant of chitosan. The most widely used coagulants for chitosan are basic solutions. Preferred basic solution has a concentration of at least about 2% base; more preferred basic solution has a concentration of at least about 5%; and most preferred has at least about 10%. Although any organic base or alkali material may be employed, the most typically used is sodium hydroxide. Other suitable alkali materials include potassium hydroxide, sodium carbonate, potassium carbonate, ammonia, ethylene diamine and the like.

The chitosan solution can be shaped into any desired configuration to meet different needs of each application. Shaping may be carried out by any conventional methods known in the art. The solution can be placed in a mold of any desired shape and then gelled in the mold. For example, a layer of chitosan solution can be placed on a flat surface to form a sheet; the solution can be expressed through an aperture to form a filament fiber or tube, or it can be dripped into a gelling solvent to form granules. Any desired configuration (tubes, cubes, rectangular shapes, sphere, such as beads, pellets, sheets, which may be in the form of membrane) can thus be obtained.

As discussed above, chitosan gels formed by setting or coagulation, as described above, do not have any substantial physical strength. Consequently, the chitosan gels of the present invention are crosslinked with one or more of crosslinking agents in order to increase the physical strength and to preserve the porous structure of the gels.

The suitable crosslinking agent for the present invention is reactive to the hydroxyl groups and/or amine groups present in chitosan. Preferably, the suitable crosslinking agent is reactive to the hydroxyl groups. A large number of well-known chemical crosslinking agents are available. Suitable crosslinking agents include diisocyanate compounds, which can be aliphatic, cycloaliphatic or aromatic. Aromatic diisocyanates, such as 2,4-tolylene diisocyanate, 4,4-diphenylmethane diisocyanate, and 1,4-phenylene diisocyanate, are exemplary of preferred embodiments. Other suitable agents for crosslinking the hydroxyl moiety include, for example, diacid halides, such as halide salts of adipic acid, glutaric acid or succinic acid, diepoxides, epichlorohydrin, aldehydes, dialdehydes, trimetaphosphates, vinyl sulfones, urea-formaldehyde systems and, di-halogenated aliphatics. Of these, the preferred are diisocyanates, including 2,4-tolylene diisocyanate, 4,4-diphenylmethane diisocyanate, 1,4-phenylene diisocyanate, xylylene diisocyanate, isophorone diisocyanate and hexamethylene diisocyanate. The most preferred is 2,4-tolylene diisocyanate.

The crosslinking process of the present invention is conducted in a crosslinking solvent that is not reactive with the crosslinking agent and with chitosan. Crosslinking solvents suitable for the present invention are aprotic solvents. The suitable solvents include acetone, chloroform, dimethyl sulfoxide, toluene, pyridine and xylene.

The gelling solvent, i.e., water, can be replaced directly with a crosslinking solvent. Alternatively, if the crosslinking solvent is not miscible with the gelling solvent, one or more of intermediate solvents may be utilized. A suitable intermediate solvent is miscible with both gelling solvent and crosslinking solvent.

In general, the gelling solvent should be substantially, if not completely, removed from the gel prior to crosslinking if the selected crosslinking agent is reactive with the gelling solvent since the reaction between the gelling solvent and crosslinking agent tends to diminish the crosslinking. For example, water, the gelling solvent, will react with crosslinking agents such as tolylene diisocyanate (TDI). Replacement of the gelling solvent with a crosslinking solvent is generally referred to herein as a solvent exchange step. The actual exchange to the crosslinking solvent from the initial gelling solvent may comprise one or more exchanges of the gelling solvent with an intermediate solvent or solvents prior to replacing the intermediate solvent with the selected crosslinking solvent.

In a preferred embodiment of the present invention, the intermediate solvent has a surface tension which is lower than that of the gelling solvent. In more preferred embodiments, the intermediate solvent has a surface tension of less than 75 dynes/cm. In further preferred embodiments, the intermediate solvent has a surface tension equal to or less than about 50 dynes/cm. In particularly preferred embodiments, the intermediate solvent has a surface tension equal to or less than about 40 dynes/cm. In more particularly preferred embodiments, the intermediate solvent has a surface tension which is equal to or less than about 30 dynes/cm.

Illustrative of suitable intermediate solvents are alcohols, such as methanol, ethanol, propanol and butanol; esters, e.g. methyl and ethyl acetate; ketones, acetone, methyl ethyl ketone; and others such as DMSO, DMF, methylene chloride, ethylene chloride, tetrahydrofuran, dioxane, and the like. Acetone is one of the preferred intermediate solvents for several reasons. Acetone is readily available and is relatively innocuous; it is also soluble in water and toluene. If more than one intermediate solvent is used, then the intermediate solvent need only be miscible with the prior and subsequently used solvents. For example, water can first be exchanged with acetone, which is miscible both with water and with a subsequent crosslinking solvent such as toluene. It has been found that when the gelling solvent is abruptly replaced with a crosslinking solvent having substantially different surface tension and a polar characteristic, a large portion of the pores of the gel, especially fine pores, collapse to form less porous gel. The collapse of the pores not only significantly decreases the surface area of the porous bodies, but also reduces their dimensional stability, as stated before. Such uncrosslinked pores are free to swell and shrink upon exposures to different solvents.

In order to maintain the porous gel structure, without causing shrinkage or collapse of the gel upon removal of the gelling solvent, care must be taken when replacing the gelling solvent with an intermediate solvent (or a crosslinking solvent if no intermediate solvent is employed). In order to preserve the porous structure of chitosan gels, the use of a number of gradual solvent exchanges is necessary, using the same intermediate solvent or crosslinking solvent at increasing concentrations. Such solvent exchange is herein referred to as solvent exchange over a concentration gradient. The concentration gradient is used to stepwise decrease the surface tension of the liquid within the gel. An effective concentration gradient is an interval of changes in concentration of intermediate or crosslinking solvent which prevents significant collapse of the gel structure and avoids substantial shrinkage of the gel. In general, though not necessarily, at least one solvent exchange is performed; in many of the preferred embodiments more than one solvent exchanges are employed. Desirably, the number of steps used and the amount of organic waste generated in each batch of exchanges should be minimized. Intermediate waste can be reused, redistilled or separated to recover the solvents. For each solvent exchange step, sufficient time should be allowed for the replacement solvent to reach equilibrium. Equilibrium is the point at which the concentration of the replacement solvent inside the gel is in equilibrium with the concentration of the replacement solvent at the outer surface of the gel.

The intermediate solvents are usually a mixture of the intermediate solvent and the gelling solvent until 100% intermediate solvent is exchanged. The initial concentration of intermediate solvent (or crosslinking solvent, if no intermediate solvent is used), may contain from about 5 to about 25 volume % of the intermediate solvent, and thereafter the solvent exchanges over the concentration gradient can take place in increasing intervals of 10 volume % or higher.

In preferred embodiments, the intermediate solvent is initially employed in a concentration ranging from about 10 to 25 volume % and the concentration is then stepped up in intervals of from about 15 to about 25 volume %. The incremental increases of from about 20 to about 25 volume % are particularly preferred to minimize the number of solvent exchanges.

Once a substantially complete exchange of intermediate solvent for the initial gelling solvent has taken place, the intermediate solvent can generally be exposed directly to 100% of the crosslinking solvent. Although it is theorized that for most hydrogel polymers no gradient is required for the exchange from the intermediate solvent to the crosslinking solvent, there may be a situation where a concentration gradient is used for the exchange of an intermediate solvent and a crosslinking solvent.

Other techniques may be used to prepare the gel for crosslinking. These may be used in addition to or instead of the solvent exchange processes. Sometimes it may be preferable to perform at least one solvent exchange in connection with such techniques. Illustrative of such alternate techniques are freeze-drying and supercritical fluid extraction. Freeze-drying is advantageous since a solvent exchange procedure should not be necessary. On the other hand, a supercritical fluid extraction can also be beneficial since water can be exchanged by this method, with or without the need for intermediate solvent exchanges.

Freeze-drying is a well-known procedure which is frequently used in the food industry. The material to be freeze-dried is first cooled to below the freezing point of the solvent, followed by vacuum drying, as known in the art. The resulting freeze-dried hydrogel structure is directly placed in a crosslinking solvent to be crosslinked. Because the freeze drying process may not well preserve the porous gel structure, it may be necessary to add surfactants, elastomeric additives or polyols to the chitosan composition to prevent the collapse of pores during the freeze-drying process.

Super-critical fluid extraction involves extractions of the gelling solvent or intermediate solvent at high pressure using supercritical $CO_2$ in the liquid phase. Supercritical $CO_2$ is non-polar and can replace the solvent present in the gel. When the pressure is released, the $CO_2$ evaporates from the porous material. This technique can be used in a fashion analogous to that which has been described for the preparation of inorganic aerogels.

Following freeze-drying or supercritical extraction, the dried material is exposed to a crosslinking agent, which can be provided in solution or in the gas phase, to form a crosslinked porous body. The solvent for the crosslinking agent can vary widely. Such a solvent or gas acts as a carrier vehicle for the crosslinking agent. Obviously, the carrier vehicle should be inert to the gel material and capable of solubilizing the crosslinking agent. The supercritical fluid extraction method may be a preferable procedure for making materials of very low density materials, i.e. less than about 0.05 $g/m^3$.

The present porous bodies may have varied degrees of crosslinkage to suit the needs of different applications. The novel gradient solvent exchange process of the present invention that prevents the collapse of the gel pores can facilitate up to 100% crosslinking of all available functional groups present on the surface of the porous gels. The porous bodies of the present invention, which are highly crosslinked, exhibit high dimensional stability, minimal swellability and excellent chemical integrity even when exposed to different solvents. In a preferred embodiment, up to 75% of the hydroxyl functionalities are crosslinked; more preferably, up to 85% are crosslinked; and most preferably, up to 100% are crosslinked. Since, as is known in the art, the maximum molar concentration of available functionalities can be empirically calculated for a given starting concentration of chitosan, the approximate amount of crosslinking agent needed to accomplish the desired level of crosslinkage can easily be determined.

Upon completion of the crosslinking process, the crosslinking solvent is removed from the crosslinked bodies by a variety of conventional techniques, such as draining the solvent from the solid crosslinked bodies. Evaporation under vacuum is another suitable technique. Suitably, the solid crosslinked bodies are then dried under reduced pressure at temperature of at least 20° C. to evaporate leftover solvents or volatile crosslinking agents from the crosslinked bodies.

The porous chitosan bodies of the present invention may be characterized by their low density and high surface area. The porous bodies of the present invention have a low density of less than about 0.75 $g/cm^3$, preferably less than or equal to about 0.5 $g/cm^3$, more preferably less than or equal to about 0.3 $g/cm^3$, and most preferably less than or equal to 0.2 $g/cm^3$. In other preferred embodiments, the density is equal to or less than 0.15 $g/cm^3$, and more preferably less than about 0.1 $g/cm^3$ or even less than about 0.05 $g/cm^3$. However, preferably, the porous bodies a minimum density which is at least sufficient to maintain the 3-dimensional lattice structure of the body. In many preferred embodiments of the invention, the bodies have a density of at least about 0.01 $g/cm^3$, and preferably at least 0.02 $g/cm^3$.

The starting concentration of chitosan directly affects the density of the porous bodies. An effective amount of chitosan material is used. An "effective" amount is the concentration of chitosan in a gelling solvent which is sufficient to form a gel. It has been found that as the concentration of chitosan in the solution increases, the density of the porous body increases. Consequently, the effective amount of chitosan will vary with the selected density of the porous body.

The present porous bodies have a surface area of at least about 170 $m^2/g$, preferably at least about 180 $m^2/g$, more preferably at least about 200 $m^2/g$, and most preferably about 250 $m^2/g$. In particularly preferred embodiments, the surface area is at least about 300 $m^2/g$, and more preferably at least about 350 $m^2/g$.

The novel chitosan bodies of this invention have excellent surface area characteristics, which can play a substantial factor in the utility of the porous bodies articles formed therefrom. For example, their high surface area, higher than that of other available materials, is available for attachment of active agents, filtration or adsorption of materials. An increase in surface area per unit weight of a material often minimizes the amount of material needed to perform a desired function. For example, the ability of a given amount of a material to perform as an adsorbent can be viewed as a function of the amount of adsorption per unit weight of the material. The more surface area per unit weight, the better the material will function as an adsorbent.

The open-celled nature of the porous bodies of this invention can be further characterized in part by pore volume and pore diameter.

The present porous bodies have a pore volume of at least about 1.2 $cm^3/g$, preferably at least about 1.5 $cm^3/g$, and more preferably at least about 2.0 $cm^3/g$. In particularly preferred embodiments, the pore volume is at least about 2.5 $cm^3/g$, more preferably at least about 3.0 $cm^3/g$, and most preferably at least about 4.0 $cm^3/g$.

The pore diameter can vary substantially to achieve a given pore volume. Generally, the open-celled lattice structure of the porous bodies have an average pore diameter of at least about 50 Angstroms (Å). In preferred embodiments, the average pore diameter is at least about 100 Å, and more preferably at least about 200 Å. In particularly preferred embodiments, the average pore diameter is at least about 250 Å, preferably at least about 300 Å, and most preferably at least about 350 Å. In alternatively preferred embodiments, the average pore diameter ranges from about 50° Å to about 500 Å.

In alternative embodiments of the invention, the average pore diameter of the porous bodies can be varied to accommodate specific applications or screen different materials. For example, in preferred embodiments of the invention, one can use articles having an average pore diameter of about 150 to 400 Å to entrap or immobilize a specific molecule such as an enzyme within the pores of a shaped body. For other applications, such as forming insulation materials from materials of this invention, a relatively small pore (10 to 150 Å) may be desired. For applications in which rapid diffusion is important, a relatively large pore diameter may be desired.

One method for controlling the average pore diameter of the present porous bodies involves changing their density of the porous bodies, i.e., by changing the starting concentration of chitosan. It is important to note as the density of the porous bodies decreases, the average pore diameter of the bodies increases. Alternatively, the pore diameter can be controlled by employing a "ghost" mold or imprint technique. The "ghost mold" or imprint technique involves adding to the gel a material (prior to, during, or after gelation) which can later be removed from the gelled material. The ghost material leaves void space when removed. It can be removed by conventional techniques known in the art, such as dissolution or chemical etching.

In spite of their relatively low density, the bodies and articles formed therefrom possess beneficial strength characteristics for a desired utility (e.g. support). The crosslinked, open-celled 3-dimensional lattice structure is believed to provide much of the strength. The porous body has a compressive strength such that the body does not fall apart or collapse when subjected to pressure. The porous bodies of this invention have a relatively low yield. Compressive yield corresponds to the stress-strain curve for a given amount of pressure applied to a material of known dimensions. This curve reflects the amount of compression resulting from the applied pressure. See Sibilia's A Guide to Materials Characterization and Chemical Analysis VCM Publishers 1988, 273–275.

The porous chitosan bodies of the present invention have compressive strength equal to or less than 75% yield at 300 psi, preferably equal to or less than 50% yield at 300 psi, more preferably equal to or less than 25% yield at 300 psi, and most preferably equal to or less than about 10% yield at 300 psi. In alternative embodiments, the compressive strength is equal to or less than about 10% yield at 1000 psi.

The present porous chitosan bodies exhibit numerous beneficial properties including low density, high surface area, and dimensional stability as well as high pore volume. The present chitosan bodies may also be produced to have a high level of crosslinkage to be unshrinkable and unswellable even when thoroughly dehydrated and rehydrated. In addition, the porous bodies have excellent strength characteristics as exemplified by compression yield. The numerous beneficial properties of the bodies provide a material with many uses, such as active-agent support materials, fillers, absorbents, adsorbents, filters, fibers, membranes and many other applications.

Principal advantage of the porous bodies of this invention and articles formed therefrom is the diversity of chemical modification which can be performed on the gel-forming prior to, during or after isolating the open-celled porous cross-linked body. Chitosan bodies contain functional amine groups in addition to hydroxyl groups, which may be modified by conventional reagents in the art. The number of functional groups which can be derivatized by chemical modification depends on the extent of functional groups of chitosan which are involved in the crosslinking. With less crosslinking, more functional groups will be available for chemical modification.

The numerous modifications which can be performed on the functional groups of the present porous bodies make the range of applications for the porous bodies and articles made therefrom almost endless. Suitable uses include storage and transport of chemicals; support applications, e.g. catalytic reactions or filter media; and insulation and separation applications.

The following examples are merely illustrative of our invention and should not be considered limiting in any way.

Procedures for Measuring Properties of the Materials

Surface areas were determined by nitrogen adsorption. Samples were first degassed for 16 hours in a helium atmosphere at 50° C. Adsorption/desorption measurements were made on a Quantasorb sorption systems, a continuous flow gas chromatographic instrument, manufactured by Quantachrome Corp., Syosset, N.Y. Values reported are based on single point measurements at liquid nitrogen temperature, 78K, and 0.3 partial pressure of nitrogen in helium with a total flow rate of 20 $cm^3/min$. The surface areas were calculated using the BET (Brunauer, Emmett and Teller) isotherm following the procedure recommended by the equipment manufacturer.

The particle bulk density, pore volume and average pore diameter were determined by mercury porosimetry. Samples were first degassed for 16 hours in a helium atmosphere at 50° C. Measurements were made on a Autopore 9210 mercury porosimeter manufactured by Micromeretics, Norcross, Ga. Measurements were taken over the pressure range 20 to 60,000 $lb/in^2$ (138,000 to 410,000,000 Pa) at 60 points with roughly equal logarithmical spacing. Pressures are converted to pore diameters via the Washburn equation where the surface tension of mercury, 485 dyne/cm, and the contact angle, 140°, are assumed. The corresponding pore diameters go from 10 μm to 3.6 nm. The particle bulk density is measured at 20 lb/in² (138,000 Pa), and the apparent bulk density is calculated by measuring the volume of a known weight of packed granules having a size range between about 20 and about 40 mesh. The pore volume includes those pores filled as the pressure changes over the range of the experiment. The average pore diameter is defined as four times the ratio of the pore volume to the total pore area, where the pore surface for pores of a given diameter is calculated from the incremental pore volume assuming cylindrical shape. Procedures followed for operation and analysis were those recommended by the manufacturer of the porosimeter.

The procedure used for the determination of compressive properties of the crosslinked materials was in accordance with the ASTM D 1621-73 testing procedure.

EXAMPLE 1

PREPARATION OF A POROUS BODY FROM CROSSLINKED CHITOSAN 5 grams of chitosan flakes, Practical Grade made from crab shell which is available from Sigma Chemical, were dissolved in a solution of dilute acetic acid (96 ml distilled water+3.75 ml glacial acetic acid). The flakes were allowed to fully hydrate, and the viscous solution was centrifuged to remove air bubbles. The gel was then made by contacting the viscous hydrocolloid with a solution of 10% (w/w) sodium hydroxide for 24 hr. The gel was then sliced and washed in distilled water to remove excess NaOH solution. The washed slices were then solvent exchanged into toluene as described in Example 1, and crosslinked with 2,4-TDI as described above. The crosslinked product was then dried in a vacuum oven, and ground to a powder (40 mesh or less). Table 1, below, lists the physical properties of the final product.

TABLE 1

| Apparent Bulk Density | 0.0877 g/cm³ |
|---|---|
| Surface Area | 364 m²/g |
| Pore Volume | 4.386 cm³/g |

COMPARATIVE EXAMPLE 1

Using the chitosan crosslinking procedure disclosed in Kokai Patent Publication No. 133143-1986, "Heavy Metal Adsorbing Agent", a sample was prepared.

A material was prepared as described in example 1 of this publication. Shrinkage of the material produced using their protocol was used as a guide to assess collapse of the material. The degree of collapse of their material was compared to those values obtained using our procedures in order to determine the relative performance of the two procedures.

Chitosan, was dissolved in a solution of dilute acetic acid and then placed in a solution of sodium hydroxide, which gels the chitosan to form an opaque, friable material. The coagulated chitosan pellets are placed directly into acetone, and after washing with fresh acetone, added 2,4-tolylene diisocyanate to effect the crosslinking. The chitosan pellets shrank during the initial exposure to acetone. The initial diameters of 20 pellets were measured using a micrometer, and the pellets were remeasured after drying the pellets. The pellets went from an average initial diameter of 2.27 mm to only 1.457 mm after drying, a loss of 57.5% in diameter. Using the procedure of our Example 1 procedure, however, the loss was only about 3.3%.

EXAMPLE 2–3

Examples 2–3 and Comparative Examples 2–3, infra, were conducted to compare the present porous body producing process with the prior art process as disclosed in U.S. Pat. No. 4,833,237 (Kawamura method).

EXAMPLE 2

35 g of acetic acid was dissolved in 930 g of water and then 70 g of chitosan, Practical Grade made from crab shell which is available from Sigma Chemical, was added and dissolved. The solution was pumped through a needle of 0.25 mm opening into a basic solution comprising 10% sodium hydroxide, 50% methanol, and 40% water to coagulate and to form a spherical particles (porous bodies). The porous bodies were precipitated and washed with water to completely remove sodium hydroxide. The cleaned porous bodies were vacuum filtered to remove water contained therein, and then the bodies were subjected to a 4-step incremental solvent exchange process was utilized, using 75% water/25% acetone mixture, 50% water/50% acetone, 25% water/75% acetone, and 100% acetone, in order. 1.5 mol of hexamethylene diisocyanate per one mol of the glucosamine residue of the chitosan employed were added to the acetone suspension of the porous bodies and then reacted at 30° C. for 1.5 hours with stirring.

The resulting porous bodies were divided into two portions, and one portion was freeze-dried (Fd) and the other was air-dried (Ad) at room temperature. Both air-dried and freeze-dried specimens were tested for their apparent bulk density (ABD), and pore characteristics were determined by mercury porosimetry. Freeze-dried specimens were further tested for their surface area (SA) using the BET procedure in a Quantachrome, manufactured by Quantasorb, and tested for swellability by placing the specimens in 100% methanol and in water. The results are shown in Table 2.

EXAMPLE 3

The procedures outlined in Example 2 were repeated with 20 g of chitosan. The results are shown in Table 2.

COMPARATIVE EXAMPLES 2–3

COMPARATIVE EXAMPLE 2 (C2)

Example 2 was repeated, except the concentration gradient solvent exchange process was not utilized. Instead, the solvent exchange procedure outlined in U.S. Pat. No. 4,833,237 to Kawamura et al. that produced the best result (Example 3) was utilized for Comparative Examples 2–3. Accordingly, the coagulated gel granules were directly transferred into a pure acetone solution containing 1.5 mol of hexamethylene diisocyanate per one mol of the glucosamine residue of the chitosan to be crosslinked. The results are shown in Table 2.

COMPARATIVE EXAMPLE 3 (C3)

Comparative Example 2 was repeated, except only 20 g of chitosan was used. The results are shown in Table 2.

TABLE 2

| Example | SA ($m^2/g$) | ABD Fd ($g/cm^3$) | ABD Ad ($g/cm^3$) | Swellability MeOH (%) | Swellability Water (%) |
|---|---|---|---|---|---|
| Ex. 2 | 304 | 0.176 | 0.178 | none | none |
| Ex. 3 | 174 | 0.191 | 0.173 | 3.2 | 4.6 |
| C2 | 143 | 0.22 | 0.655 | 14.8 | 22.2 |
| C3 | 112 | 0.24 | 0.604 | 6.3 | 12.5 |

As can be seen from Table 2, the porous bodies produced in accordance with Kawamura method have significantly smaller surfaces area and higher densities than the porous bodies produced in accordance with the present concentration gradient solvent exchange process. More importantly, the best process outlined in Kawamura produced porous bodies having a surface area substantially smaller than that of the porous bodies produced in accordance with the process of the present invention, indicating that the abrupt solvent exchange step in Kawamura method collapses substantial portions of the gel pores.

Examples 2–3 demonstrates that the porous bodies of the present invention are minimally swellable, if at all. Moreover, the porous bodies of Example 2 which contain a higher concentration of chitosan than the bodies of Example 3 exhibit highly improved resistance to swellability. In contrast, Comparative Examples 2–3 demonstrate that the higher the concentration of chitosan, the more swellable the bodies become. This contrasting result clearly demonstrates that the porous bodies of the present invention not only have improved surface area characteristics, but also have more evenly and thoroughly crosslinked structure.

What is claimed is:

1. A crosslinked, highly porous chitosan body having an open-celled 3-dimensional lattice structure, a density of less than about 0.75 $g/cm^3$, a surface area equal to or greater than about 170 $m^2/g$, a compression strength of equal to or less than about 75% yield at 300 psi, and an average pore diameter of from about 50 Å to about 500 Å.

2. The porous chitosan body of claim 1, wherein said porous body has a density of 0.5 $g/cm^3$.

3. The porous chitosan body of claim 1, wherein said body has a surface area of at least about 180 $m^2/g$.

4. The porous chitosan body of claim 1, wherein said porous body has a compression strength of equal to or less than about 50% yield at 300 psi.

5. The porous chitosan body of claim 1, wherein said body is crosslinked with a crosslinking agent selected from the group consisting of diisocyanates, diacid halides, diepoxides, epichlorohydrin, aldehydes, dialdehydes, trimetaphosphates, vinyl sulfones, urea-formaldehydes and di-halogenated aliphatics.

6. The porous chitosan body of claim 1, wherein said body is crosslinked with a diisocyanate.

7. The porous chitosan body of claim 1, wherein said body is crosslinked with an aromatic diisocyanate.

8. The porous chitosan body of claim 1 wherein said porous chitosan body has a surface area of at least about 200 $m^2/g$.

9. The porous chitosan body of claim 1 wherein said porous chitosan body has a surface area of at least about 250 $m^2/g$.

10. The porous chitosan body of claim 1 wherein said porous chitosan body has a surface area of at least about 300 $m^2/g$.

11. The porous chitosan body of claim 1 wherein said porous chitosan body has a surface area of at least about 350 $m^2/g$.

12. The porous chitosan body of claim 1 wherein said porous chitosan body has a density of less than or equal to about 0.3 $g/cm^3$.

13. The porous chitosan body of claim 1 wherein said porous chitosan body has a density of less than or equal to about 0.2 $g/cm^3$.

14. A process for making a crosslinked, highly porous chitosan body comprising the steps of:

a) dissolving chitosan in a gelling solvent, b) forming a gel from the dissolved chitosan solution into a desired configuration, c) gradually replacing said gelling solvent with a crosslinking solvent by employing a concentration gradient solvent exchange process, d) adding a crosslinking agent to crosslink said gel, and e) isolating the crosslinked gel from said crosslinking solvent, wherein said porous chitosan body has an open-called 3-dimensional lattice structure, a density of less than about 0.75 $g/cm^3$, a surface area of equal to or greater than about 170 $m^2/g$, a compression strength of equal to or less than about 75% yield at 300 psi, and an average pore diameter of from about 50 Å to about 500 Å.

15. The process of claim 14, wherein said crosslinking solvent is selected from the group consisting of acetone, chloroform, dimethyl sulfoxide, toluene, pyridine, and xylene.

16. The process of claim 14, wherein said concentration gradient solvent exchange process utilizes an intermediate solvent that is miscible to both said gelling solvent and said crosslinking solvent.

17. The process of claim 16, wherein said intermediate solvent is selected from the group consisting of alcohols, acetates, ketones, DMSO, DMF, methylene chloride, ethylene chloride, tetrahydrofuran, and dioxane.

18. The process of claim 14 wherein said crosslinking agent is selected from the group consisting of diisocyanates, diacid halides, diepoxides, epichlorohydrin, aldehydes, trimetaphosphates, vinyl sulfones, urea-formaldehydes, and di-halogenated aliphatics.

19. A process for making a crosslinked, highly porous chitosan body comprising the steps of:

a) dissolving chitosan in a gelling solvent that contains an additive selected from the group consisting of surfactants, elastomeric additives, and polyols, b) forming a gel from the dissolved chitosan solution into a desired configuration, c) freeze-drying said gel, d) adding a crosslinking solvent to the freeze-dried gel, e) adding a crosslinking agent to said cross-linking solvent, and f) isolating the crosslinked gel from said crosslinking solvent, wherein said porous chitosan body has an open-celled 3-dimensional lattice structure, a density of less than about 0.75 g/cm$^3$, a surface area of equal to or greater than about 170 m$^2$/g, a compression strength of equal to or less than about 75% yield at 300 psi, and an average pore diameter of from about 50 to about 500 Å.

20. The process of claim 19, wherein said crosslinking solvent is selected from the group consisting of acetone, chloroform, dimethyl sulfoxide, toluene, pyridine, and xylene.

21. The process of claim 19 wherein said crosslinking agent is selected from the group consisting of diisocyanates, diacid halides, diepoxides, eipchlorohydrin, aldehydes, trimetaphosphates, vinyl sulfones, urea-formaldehydes, and di-halogenated aliphatics.

* * * * *